Jan. 9, 1923.

H. G. G. DESMAREST.
WARMTH RETAINING PRODUCT.
FILED SEPT. 3, 1921.

1,441,665.

Inventor:
H. G. G. Desmarest
By Lawrence Langner
Attorney

Patented Jan. 9, 1923.

1,441,665

UNITED STATES PATENT OFFICE.

HENRI GEORGES GASTON DESMAREST, OF PARIS, FRANCE.

WARMTH-RETAINING PRODUCT.

Application filed September 3, 1921. Serial No. 498,485.

*To all whom it may concern:*

Be it known that I, HENRI GEORGES GASTON DESMAREST, a citizen of the French Republic, and a resident of 82 Rue Lauriston, Paris, France, have invented new and useful Improvements in a Warmth-Retaining Product (for which I have filed applications in France, August 2, 1917, Patent No. 486,350, and January 21, 1918, Patent No. 497,112, and in Belgium July 6, 1920), of which the following is a specification.

The present invention has for object a warmth-retaining product, that is to say one which is a poor conductor of heat, composed of a paper or woven material covered with a layer of powdered cork. The said layer is caused to adhere to its backing or support, paper or woven material, by a flexible coating or adhesive capable of retaining to the paper or to the woven material all its pliableness and elasticity in order to permit the use of such product in the preparation of garments to the same degree as any other woven material, either directly or as a lining. The said product can be utilized wherever heat-retaining coverings are required.

The manufacture of these cork-coated papers and woven materials can be effected by hand or by machine.

(1) In the case of hand-manufacture, the paper or the woven material to be prepared, preferably cotton or linen cloth, is coated by the aid of a large brush with a light or weak solution of indiarubber in benzine, petroleum spirit, carbon disulphide or other suitable solvent; this layer of rubber can be replaced by any other adhesive capable of maintaining its suppleness or flexibility after drying; upon this layer of dissolved indiarubber there is spread or distributed, by the aid of a sieve or any other spreading apparatus, cork in finely powdered form. Once covered by cork and after slight evaporation of the solvent, or after cold or hot drying of the elastic layer of indiarubber, the paper or the woven material covered with cork can be calendered in such a manner as to impart thereto a homogeneous surface.

(2) For machine preparation, the paper or cloth is passed over different rollers which automatically impregnate it with the rubber solution, cover it with powdered cork and effect a calendering operation either hot or cold, according to the state of dryness of the elastic layer after having passed over several rollers.

The heat-conserving papers and woven materials thus prepared are similar to glass-paper and emery cloth, but because of the elasticity of the adhesive layer, they retain their original flexibility or suppleness and by their heat-retaining or warmth-conserving properties can replace woollen materials in the making up of garments.

Thus a wad or padding of cork is obtained in the form of a homogeneous product, a sort of slightly compressed agglomerate which can be made in sheets or lengths of any dimensions, yielding a substance extremely flexible, elastic, slightly spongy, soft to the touch and having the characteristic appearance of deer or buck skin or chamois.

The layer of cork can be applied upon only one of the sides or upon the two sides of the supporting paper or woven material.

Preferably there is employed as the support or backing a textile network of not too close mesh, made of cotton threads, silk, linen or other flexible material.

By reason of a chemical transformation which takes place in the mass, by oxidization, the cellulose of the cork absorbs the indiarubber which seems to disappear. Thus there is obtained a sort of cork skin, formed of cork fortified by a support or backing.

The annexed sheet of drawings show by way of example, in a diagrammatic manner, a machine enabling a continuous manufacture of this heat-conserving wad or padding of cork or heat-conserving material.

The strip of woven material A, for instance a cotton band, forming the flexible support or backing and intended to be covered by rubber-containing emulsion and powdered cork on both faces, unwinds from a spool B; this band passes over a roller H and dips into a bath C containing the rubber emulsion, in which bath the band A is guided by the rollers I J. Rollers or cylinders L L spread and equalize the rubber emulsion over the two faces of the band of woven material and force the emulsion between the threads of the material. A fork K guides the band A and evenly distributes the emulsion over the edges forming the selvages before the band passes out from the bath. A draw off device O serves for the emptying of the bath C. The band A afterwards passes into a casing or hood E containing the cork in the form of powder; rollers F and G arranged within this casing serve to stretch or tension in a suitable manner the emulsified band which is covered with cork on its two faces. The bottom of the casing can be opened to permit the rapid emptying of the powdered cork. Apertures Q and R serve for the introduction of the powdered cork into the casing E. These apertures may be furnished with a kind of funnel having a hopper for the continuous feed of the machine; in such case, the dimensions of the casing E may be reduced.

Before passing out from this casing, the band A travels between flexible blades or plates, or very fine brushes M which prevent powdered cork from being carried to the exterior of the casing. The band impregnated with cork passes at its exit from the case E over a guide or supporting roller D and between calendering cylinders S the pressure of which can be adjusted; these rollers S are provided with driven gear wheels whereby the band A may be continuously drawn forward, a steadying flywheel P being also provided on one of the shafts which carries a roller S.

According to the resistance of the woven material and the friction to be overcome, each of the rollers can be driven by an endless band travelling at the peripheral speed of the driving fly-wheel.

The machine can be made in a more squat and vertical form by arranging the emulsion bath in the framework and below the cork-powder casing.

In order to obtain bands having greater or less thickness of cork padding, it is sufficient to repass the textile band several times through the machine which each time impregnates the band upon its two faces, with a new layer of emulsion and of cork, care being taken to allow the new layer to dry sufficiently by evaporation between each operation by methods similar to those employed for the preparation of the bands.

Figure 1:
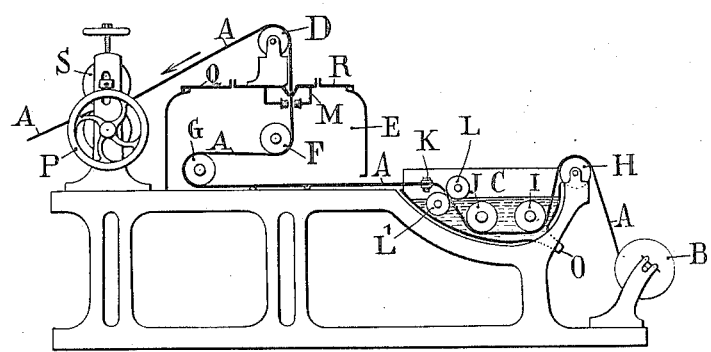
Figure 1 is an elevation of this machine partly in section.
Figure 2:
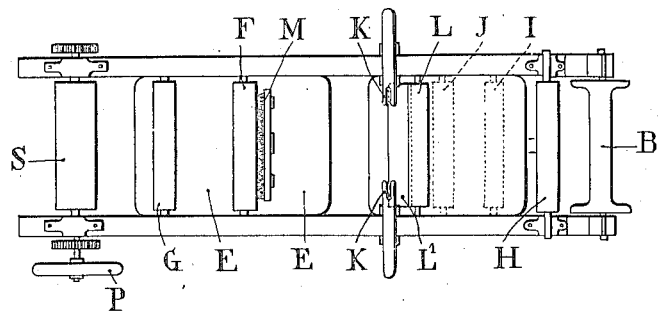
Figure 2 is a plan view.
Figure 3:
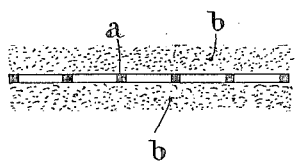
Figure 3 is a sectional view of the heat-conserving product obtained.

Figure 3 shows in a sectional manner, the warmth-conserving product obtained; *a* designates the band of woven textile, having not too close a mesh, which serves as the backing, and *b* indicates the layer of pulverized cork which has been secured to the support *a* by the adhesive substance, on the two faces of the support. In order to render the wad or padding of cork pervious to air and vapour, which is useful from the hygienic point of view when intended for the lining of garments, the finished and dried bands may be perforated with a series or net-work of capillary holes, either by causing the bands to pass between two cylinders furnished with very fine pins or points or between two metal combs, between the opposite points of which high-tension electric sparks are passed in such a manner as to form a capillary perforation.

The separate perforation of the cork wad or padding is unnecessary if it is to be employed as a lining for a garment being covered by any textile material to which it is sewn or stitched, because in such cases the needle holes afford a sufficient passage for air.

If desired, the machine may be very long, the part serving to coat the supporting woven material being considerably separated from the part of the machine which serves to apply the cork-powder (E. F. G.); the coated textile network in that case can be exposed to the air for several minutes before its passage into the powdered-cork portion of the machine.

What I claim is:—

1. As a new article of manufacture, a heat-retaining and insulating product, permeable to air and water vapour, comprising a flexible support, an adhesive substance coated on the said support, and a layer of spongy, powdered cork, fixed to the said support by the adhesive substance.

2. As a new article of manufacture, a heat-retaining and insulating product, permeable to air and water vapour, comprising a flexible support, an adhesive substance coated on the said support, and a discontinuous layer of spongy, powdered cork, adapted to allow passage of air and water vapour, fixed to the said support by the adhesive substance.

3. As a new article of manufacture, a heat-retaining and insulating product, permeable to air and water vapour, comprising a flexible support, an adhesive substance coated on the said support, and a perforated layer of spongy, powdered cork, adapted to allow passage of air and water vapour, fixed to the said support by the adhesive substance.

In testimony whereof I have signed my name to this specification.

HENRI GEORGES GASTON DESMAREST.

Witnesses:
T. ARMENGAUD,
W. DE FÉVRIMONT.